United States Patent
Jain et al.

(10) Patent No.: US 8,190,725 B2
(45) Date of Patent: May 29, 2012

(54) STANDARDIZED MECHANISM OF REMOTE MANAGEMENT OF EMBEDDED RADIO MODULES

(75) Inventors: Bhuvanesh N. Jain, Tamil Nadu (IN); Ramasubramanian Ramani, Redmond, WA (US); Jayaraman Kalyana Sundaram, Hyderabad (IN); Krishnan Gopalan, Hyderbad (IN); Ramachandran Venkatesh, Hyderabad (IN); Kranthi Kumar Mannem, Andhra Pradesh (IN); Himabindu Thota, Hyderbad (IN); Padmapriya Aradhyula, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 12/165,828

(22) Filed: Jul. 1, 2008

(65) Prior Publication Data

US 2010/0005155 A1   Jan. 7, 2010

(51) Int. Cl.
*G06F 15/173* (2006.01)
(52) U.S. Cl. .......................... 709/223; 709/224
(58) Field of Classification Search .................. 455/3, 1; 370/254; 710/11; 709/223, 224
See application file for complete search history.

(56) References Cited

U.S. PATENT DOCUMENTS

| | | | |
|---|---|---|---|
| 7,142,092 B2 | 11/2006 | Ramamurthy et al. | |
| 7,983,212 B2 * | 7/2011 | Ravi et al. | 370/328 |
| 2005/0228853 A1 * | 10/2005 | Yamamura et al. | 709/200 |
| 2006/0047464 A1 | 3/2006 | Kumar et al. | |
| 2006/0053234 A1 * | 3/2006 | Kumar et al. | 710/11 |
| 2006/0152349 A1 | 7/2006 | Ratnakar | |
| 2006/0163338 A1 | 7/2006 | Allen et al. | |
| 2007/0103303 A1 | 5/2007 | Shoarinejad | |
| 2007/0138302 A1 | 6/2007 | Antoniou | |
| 2007/0200712 A1 | 8/2007 | Arneson et al. | |
| 2008/0070495 A1 * | 3/2008 | Stricklen et al. | 455/3.01 |
| 2009/0059813 A1 * | 3/2009 | Ravi et al. | 370/254 |
| 2009/0195361 A1 * | 8/2009 | Smith | 340/10.1 |

FOREIGN PATENT DOCUMENTS

WO   2006089411   8/2006

OTHER PUBLICATIONS

Floerkemeir, Christian, et al., "RFID Application Development with the Accada Middleware Platform", IEEE Systems Journal, vol. X. No. X. Dec. 2007, 13 pages.
RFIDa—RFID Technology, "RFID Anywhere: Smart Reader Components . . . ", Jan. 2006, 5 pages.
Reva Systems, "Partners Technology", Based on information and belief available, at least as early as Apr. 17, 2008, 3 pages.
Fontana, John, "BizTalk beta brings MS closer to RFID platform", May 2007, 4 pages.
Biztalk Rulez, "BizTalk 2006 R2 Adapter Pack per RFID Mobility e Office Developer", Mar. 2008, 3 pages.

* cited by examiner

*Primary Examiner* — Brian P Whipple
(74) *Attorney, Agent, or Firm* — Workman Nydegger

(57) ABSTRACT

A standardized mechanism of remote management of mobile devices using Low Level Reader Protocol (LLRP) is disclosed. An LLRP provider application runs on a server. A remote management application runs on a mobile device. The LLRP provider application and the remote management application communicate using LLRP. The remote management application uses Device Service Provider Interface (DSPI) to communicate with hardware on the mobile device. The LLRP provider application discovers a mobile device, requests at least one of configuration or metadata information, and receives at least one of configuration or metadata information. The remote management application receives a request for at least one of configuration or metadata information and sends at least one of configuration or metadata information.

17 Claims, 2 Drawing Sheets

STANDARDIZED MECHANISM OF REMOTE MANAGEMENT OF EMBEDDED RADIO MODULES

BACKGROUND

Background and Relevant Art

Computers and computing systems have affected nearly every aspect of modern living. Computers are generally involved in work, recreation, healthcare, transportation, entertainment, household management, etc.

It is often useful to be able to track various objects. Computer systems can be used to accomplish such tasks. For example, tracking can be accomplished by using a radio frequency identification (RFID) system. An RFID tag can be attached to objects that are to be tracked. Objects that can be tracked include store inventory, pallets, papers, biomedical tissue samples, pets or people, etc. An RFID tag typically includes an integrated circuit and an antenna. The integrated circuit can be used to store and transmit data. The antenna facilitates transmitting the data wirelessly.

Data can be transmitted to RFID modules which receive the data from the RFID tags wirelessly. From the RFID modules, the data can be provided to a central data repository or other location.

Mobile readers including RFID modules are being created in various ways. RFID modules have been integrated permanently, or semi-permanently within handheld devices. Additionally, RFID modules have been used as add-ons to systems by attaching them to universal serial bus (USB) slots or compact flash slots. Local management of these modules is possible using platform specific software. However, system administrators may have a need to manage these devices and RFID modules from a central management system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A mechanism of remote management of mobile devices is disclosed herein where a Low Level Reader Protocol (LLRP) provider application runs on a remote server and a remote management application runs on a mobile device. The LLRP provider application sends and receives configuration information or metadata information for the mobile device by communicating with the remote management application. The remote management application uses a Device Service Provider Interface (DSPI) to communicate with hardware on the mobile device and LLRP to communicate with the LLRP provider application running on the remote server. The remote management application is able to get and set configuration settings of hardware on the mobile device using DSPI. A user may get and/or set configuration information of one or more remote devices by interacting with the server.

In one embodiment, an LLRP provider application running on a server discovers a mobile device, requests configuration information of the mobile device, and receives configuration information of the mobile device.

In another embodiment, a remote management application running on a mobile device receives a request for configuration information of the mobile device and sends configuration information of the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

A mechanism of remote management of mobile devices is presented where a Low Level Reader Protocol (LLRP) provider application is running on a remote server and a remote management application is running on a mobile device. The LLRP provider application and the remote management application communicate using LLRP. The remote management application interacts with hardware on the mobile device using a Device Service Provider Interface (DSPI). A user may get and/or set configuration information of or metadata information about one or more remote devices by interacting with the server.

Figure 1:
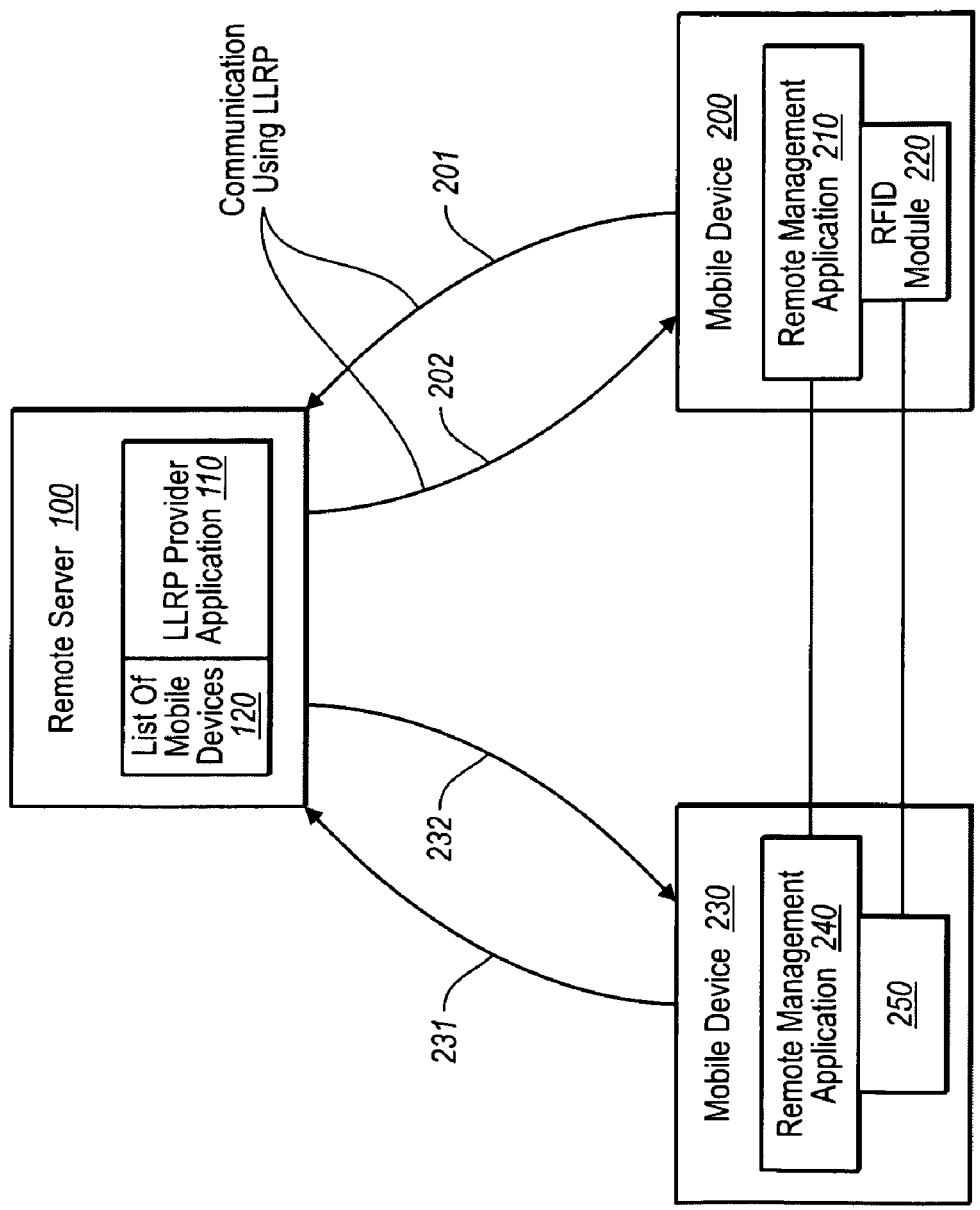
FIG. 1 illustrates communication between a remote server and mobile devices.

Referring now to FIG. 1, examples of communication between a remote server 100 and mobile devices 200 and 230 using LLRP are illustrated. The remote server 100 comprises a computing environment that can support running an LLRP provider application 110 and a list of mobile devices 120. Some computing systems that may be used for remote servers 100 or mobile devices 200 and 230 may, by way of non-limiting example, be handheld devices, appliances, laptop computers, desktop computers, mainframes, distributed computing systems, etc. The LLRP provider application 110 communicates with mobile devices 200 and 230 using LLRP. Examples of sending information from the LLRP provider application 110 are illustrated as arrows 202 and 232, while arrows 201 and 231 are examples of receiving information from the mobile devices. Many types of information may be sent or received by the LLRP provider application 110 such as identification, or other metadata, information or configuration information. Identification information may include information such as, but not limited to, the name of the mobile device, a description of the mobile device, a MAC address of the mobile device, etc. Configuration information may include information such as, but not limited to, a port on which the mobile device is listening for a connection from remote servers. Some information may properly be construed as being one or both of configuration information or metadata information. For example, the MAC address, while often considered to be identification metadata, may also be a configurable parameter considered to be configuration information.

The mobile device 200 comprises a remote management application 210. The remote management application uses DSPI to communicate with a Radio Frequency Identification (RFID) module 220. Some non limiting examples of such mobile devices 200 may include, but are not limited to mobile phones, Personal Digital Assistants (PDAs), appliances, laptops, specialized computing devices, etc. Such mobile devices may be computing system where an RFID module has been connected to the system through internal bus connections, a Universal Serial Bus (USB) slot a compact flash or other flash slot, or other suitable connection. The mobile device 230 comprises a remote management application 240. The remote management application 240 uses DSPI to communicate with hardware 250 that is DSPI compatible. One example of this type of mobile device 230 includes a mobile device with hardware 250 embodied as a sensor used to measure some environmental condition, such as temperature or other condition, where the sensor provides a DSPI interface so that the remote management application 240 is able to communicate with the sensor. Any type of hardware may be represented by item 250 so long as the hardware is DSPI compatible allowing the remote management application to communicate with the hardware.

The remote management applications 210 and 240 are able to communicate with the remote server 100 by sending and receiving information using LLRP. Arrow 201 illustrates configuration information sent from the remote management application 210 and arrow 202 shows the remote management application receiving configuration information. Remote management application 230 follows a similar pattern. Arrow 231 shows configuration information being sent from the remote management application and arrow 232 shows the remote management application receiving configuration information.

The following discussion now refers to a number of methods and method acts that may be performed. It should be noted, that although the method acts may be discussed or illustrated in the figures in a certain order, no particular ordering is necessarily required unless specifically stated, or required because an act is dependent on another act being completed prior to the act being performed.

Figure 2:
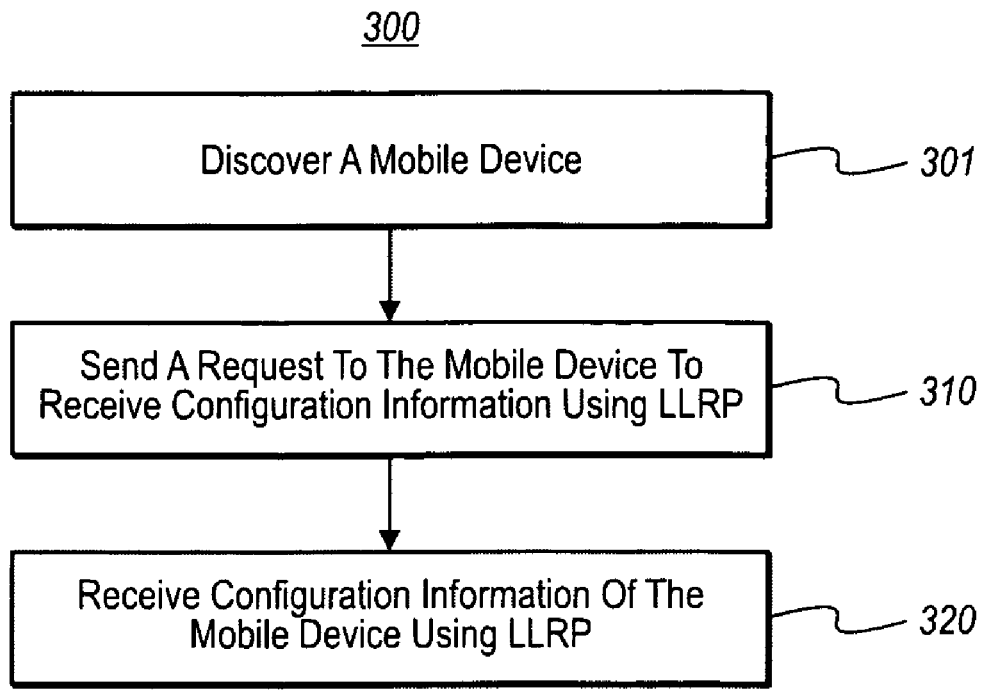
FIG. 2 illustrates a method of server communication with a mobile device.

FIG. 2 illustrates a method 300 of an LLRP provider application communicating with a mobile device using LLRP. Method 300 includes an act of discovering a mobile device (act 301). As illustrated in FIG. 1, this may be accomplished by the LLRP provider application 110 at the remote server 100 discovering the mobile device 200 or 230. This process may be facilitated in a variety of ways such as, in one example, a user entering information at the remote server 100, where the information is provided to the LLRP provider application. The information may include information such as network address or other information that facilitates finding the mobile device 200 or 230. In another embodiment, discovering a mobile device may be facilitated by retrieving information from a database or other storage medium, where the information includes information used to facilitate communication with the mobile device 200 or 230.

In another example the LLRP provider application 110 may include functionality for listening for incoming connections on a configurable port. The LLRP provider application 110 can receive a request for a connection from a mobile device 200 or 230 on the configurable port. Upon receipt of the request for connection, the LLRP provider application 110 requests information from the mobile device 200 or 230 where the information includes information that facilitates communication with the mobile device 200 or 230, such as for example, the port on which the mobile device 200 or 230 is listening for connections from remote servers.

FIG. 2 further illustrates sending a request to the mobile device to receive configuration information using LLRP. In the example illustrated in FIG. 1, after the LLRP provider application 110 has discovered the mobile device 200 or 230, the LLRP provider application 110 sends a request to the mobile device 200 or 230 to receive configuration information. The method 300 further includes receiving configuration information (act 320). For example, one of the mobile devices 200 or 230 may send configuration information to the remote server 100 which is received at the LLRP provider application 110.

In one example acts 310 and 320 are performed by the LLRP provider application 110 sending a message to get the configuration of the mobile device 200 or 230 and then receiving a message in response with the requested configuration information. In another example the LLRP provider application sends a message to get metadata describing capabilities of the mobile device and then receives a message in response with the requested capability information describing the capabilities of the mobile device.

Method 300 may also be practiced where after receiving the configuration information (as illustrated at act 320), the configuration information is made available to a user in a user interface, such as a graphical user interface. Alternatively or in addition to making the information available to a user in a user interface after act 320, method 300 may also be practiced where the LLRP provider application 110 receives user input and then sends additional configuration information to the mobile device. For example, a user may wish to change the configuration of one or more mobile devices that are connected to the remote server. This may be accomplished by the LLRP provider application sending configuration information using an LLRP message to a mobile device with configuration information and instructions to change the configuration of the mobile device with the configuration data in the LLRP message sent to the mobile device.

Notably, messages sent using the LLRP protocol may be sent between the remote server 100 and the mobile devices 200 and 230 using LLRP protocol messages as xml messages formatted into according to an appropriate xml schema for the messages.

Figure 3:
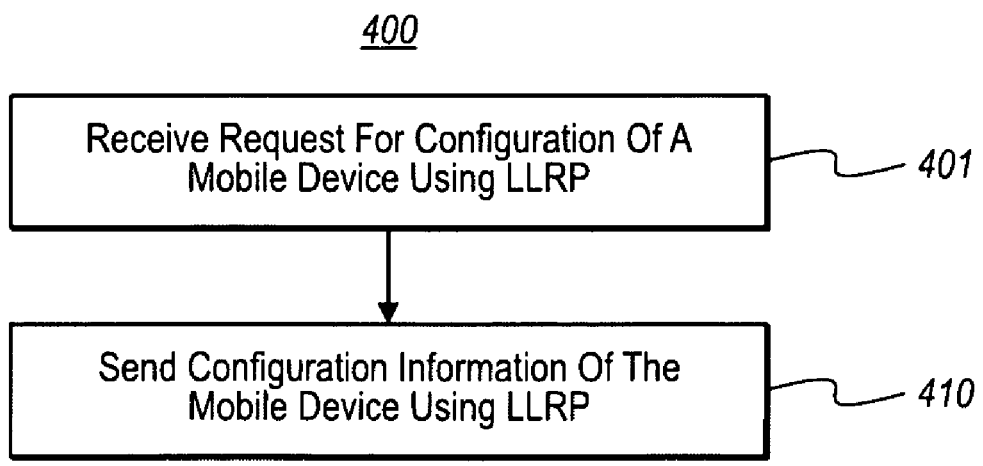
FIG. 3 illustrates a method of mobile device communication with a server.

FIG. 3 illustrates a method 400 of a remote management application communicating with a remote server using LLRP. The method 400 includes an act of receiving a request for configuration of a mobile device using LLRP (act 401). For example, and referring once again to FIG. 1, the remote management application 210 or 240 receives a request from the LLRP provider application 110 of the remote server 100 for configuration information, where the request is sent using LLRP. FIG. 4 further illustrates that the method includes sending configuration information of the mobile device using LLRP. For example, the remote management application 210 or 240, in response to the request for configuration information, may send configuration information of the mobile device 200 or 230 in which the remote management application 210 or 240 resides. In one example of the method 400, the remote management application 210 or 240 receives a message from the LLRP provider application 110 requesting configuration information about the mobile device 200 or 230 device and sends a message in response to the request with configuration data of the mobile device 200 or 230. Another example of method 400 may include the remote management application 210 or 240 receiving a message requesting capabilities of the mobile device and in response, the remote management application 210 or 240 sending a message with information of the capabilities of the mobile device 200 or 230.

Method 400 may also be practiced where prior to receiving a request for configuration of a mobile device using LLRP, discovery information is sent. For example, the remote management application 210 or 240 sends discovery information to a remote server 100. Illustratively, a new mobile device may join the network. Instead of having to manually enter information at the server used to communicate with the new mobile device, a remote management application at the mobile device sends discovery information to the server. Discovery information may be sent where the management application at the new mobile device sends a message to a configurable port at the new mobile device requesting a connection with the server. Another example of sending discovery information includes the remote management application writing information to a database that the server can access.

Method 400 may also be practiced such that after act 410 the remote management application receives configuration information and uses DSPI to change at least one configuration setting of the mobile device. For example, an administrator may wish to change the settings of one or multiple mobile devices. This may be accomplished where the mobile device receives configuration information with a command to update the settings of the mobile device.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a remote server and a mobile device, the remote server comprising a Low Level Reader Protocol (LLRP) provider application, the mobile device comprising at least one RFID module and a remote management application that uses a Device Service Provider Interface (DSPI) to communicate with the RFID module, a method of managing the mobile device from the remote server, the method comprising the LLRP provider application performing:
   (a) an act of discovering a mobile device, the mobile device comprising at least one RFID module and a remote management application that uses a Device Service Provider Interface (DSPI) to communicate with the RFID module;
   (b) an act of sending a request to the remote management application on the mobile device, wherein the request is formatted according to the LLRP and includes a DSPI communication within the LLRP formatted request, and wherein the remote management application uses the DSPI communication to retrieve at least one of configuration or metadata information from the at least one RFID module of the mobile device; and
   (c) in response to the request, an act of receiving a response that is formatted according to the LLRP, wherein the response includes at least one of configuration or metadata information of the mobile device that was retrieved using the DSPI communication.

2. A method as defined in claim 1, wherein act (a) comprises receiving user input.

3. A method as defined in claim 2, wherein the user input is entered in a graphical user interface.

4. A method as defined in claim 1, wherein act (a) comprises receiving discovery information from the mobile device using LLRP.

5. A method as defined in claim 1, wherein act (c) comprises receiving Extensible Markup Language (XML).

6. A method as defined in claim 1, further comprising an act of displaying the mobile device configuration or metadata information in a user interface.

7. A method as defined in claim 1, wherein act (c) comprises an act of receiving user input and wherein the method further comprises an act of sending at least one of configuration or metadata information to the mobile device as a DSPI communication within a request that is formatted according to the LLRP.

8. A method as defined in claim 7, wherein receiving user input is performed using a graphical user interface.

9. A method as defined in claim 7, wherein sending at least one of configuration or metadata information to the mobile device using LLRP is performed by sending XML.

10. In a computing environment comprising a remote server and a mobile device, the remote server comprising an LLRP provider application, the mobile device comprising at least one RFID module and a remote management application that uses a DSPI to communicate with the RFID module, a method of managing the mobile device from the remote server, the remote management application performing:

(a) an act of receiving a request from the LLRP provider application, wherein the request is formatted according to the LLRP and includes a DSPI communication within the LLRP formatted request which remotely requests at least one of configuration or metadata information of the RFID module of the mobile device;

(b) in response to the request, an act of extracting the DSPI communication from the LLRP formatted request and using the DSPI to request the configuration or metadata information from the RFID module; and (c) an act of sending at least one of the configuration or metadata information received from the RFID module of the mobile device to the LLRP provider application within a response that is formatted according to the LLRP.

11. The method of either claim 1 or 10, wherein the DSPI communication is included as a custom extension of the LLRP within the LLRP formatted request.

12. A method as defined in claim 10, wherein act (a) is preceded by an act of sending discovery information to a remote server using LLRP.

13. A method as defined in claim 10, wherein the act of sending at least one of the configuration or metadata information further comprises an act of formatting the configuration or metadata information as XML.

14. A method as defined in claim 10, wherein act (c) is performed by sending XML.

15. A method as defined in claim 10, further comprising an act of receiving a second request that is formatted according to the LLRP from the LLRP provider application, wherein the second request includes a DSPI communication that includes at least one of configuration or metadata information for the RFID module of the mobile device.

16. A method as defined in claim 15, wherein the act of receiving the second request is performed by receiving XML.

17. A method as defined in claim 15, further comprising an act of changing at least one of a configuration or a metadata property of the RFD module of the mobile device using the DSPI.

* * * * *